(12) United States Patent
Delbosc et al.

(10) Patent No.: US 7,949,840 B2
(45) Date of Patent: May 24, 2011

(54) METHOD FOR SAVING COMPUTER DATA

(75) Inventors: Jean-Marc Delbosc, Lisses (FR); Hubert Azambre, Les Ulis (FR); Claude Blanchet, Saint-Cheron (FR)

(73) Assignee: EMC Corporation, Hopkinton, MA (US)

( * ) Notice: Subject to any disclaimer, the term of this patent is extended or adjusted under 35 U.S.C. 154(b) by 1943 days.

(21) Appl. No.: 10/333,426

(22) PCT Filed: Jul. 20, 2001
(Under 37 CFR 1.47)

(86) PCT No.: PCT/FR01/02381
§ 371 (c)(1),
(2), (4) Date: Oct. 22, 2007

(87) PCT Pub. No.: WO02/08884
PCT Pub. Date: Jan. 31, 2002

(65) Prior Publication Data
US 2009/0216941 A1 Aug. 27, 2009

(30) Foreign Application Priority Data

Jul. 20, 2000 (FR) ...................................... 00 09541

(51) Int. Cl.
*G06F 12/00* (2006.01)
(52) U.S. Cl. ............................................. 711/162; 711/4
(58) Field of Classification Search ........................ None
See application file for complete search history.

(56) References Cited

U.S. PATENT DOCUMENTS 5,809,511 A 9/1998 Peake
5,963,971 A 10/1999 Fosler et al.

*Primary Examiner* — Brian R Peugh
(74) *Attorney, Agent, or Firm* — Muirhead and Saturnelli, LLC

(57) ABSTRACT

The invention relates to a method for saving computer data which consist in transferring the data to be saved from a client computer to a buffer storage formed by the hard disc of a backup server, organized in a plurality of volumes of predetermined size, and in then transferring the data from said buffer storage onto a final medium (for example magnetic cartridge). The invention is characterized in that it consists in recording on said permanent medium, after transferring the volumes from the buffer storage onto the final medium, a single sequence of data specific to each of said volumes (basic data), the method further comprising a step which consists in constituting a database wherein are recorded the basic data.

13 Claims, 2 Drawing Sheets

| V1 | B1 | V2 | B2 | V3 | B3 | V4 | B4 | V5 | B5 |
|----|----|----|----|----|----|----|----|----|----|

| V1 | B1 | V2 | B2 | V3 | B3 | V4 | B4 | V5 | B5 |

FIGURE 1

|   | VolumeAddress ... | | ... | |
|---|---|---|---|---|
| $V_1$ | $a_1 = 0$ | | | } $B_n$ |
| $V_2$ | $a_2$ | | | } |
| ... | | | | |
| $V_n$ | $a_n$ | | | |
| $V_{n+1}$ | $a_{n+1} > 0$ | | | $B_{n+1}$ |

FIGURE 2

METHOD FOR SAVING COMPUTER DATA

CROSS-REFERENCE TO RELATED APPLICATIONS

This application is a national phase filing of and claims the benefit of priority of International Application Number PCT/FR01/02381, filed Jul. 20, 2001, entitled or "Procede de Sauvegarde de Donnees Informatiques," which translates to "Method for Saving Computer Data". The entire disclosure contained in the above-mentioned patent application is incorporated by reference as if set forth at length herein.

STATEMENT REGARDING FEDERALLY SPONSORED RESEARCH OR DEVELOPMENT

Not applicable

REFERENCE OF A "MICROFICHE APPENDIX"

Not applicable

FIELD OF THE INVENTION

This invention relates to the domain of saving computer data.

BRIEF DESCRIPTION OF THE PRIOR ART

The state of the art includes equipment for making computer backups, comprising a server with a buffer memory, for example a hard disk, and control means for a reader-writer of permanent media.

U.S. Pat. No. 5,809,511 discloses a system for transferring data between a host station and complementary equipment comprising a cache memory and robot controlled equipment for management of backup media.

U.S. Pat. No. 5,963,971 discloses a storage system on a medium forming a virtual disk.

The purpose of this invention is to provide a solution that optimises the size of permanent media and facilitates reconstruction of data.

BRIEF DESCRIPTION OF THE DRAWINGS

The invention will be better understood after reading the description of a non-restrictive example embodiment in which:

FIG. 1 shows an aspect of the present invention constructed according to the teachings herein.

FIG. 2 shows a further aspect of the present invention constructed according to the teachings herein.

DETAILED DESCRIPTION OF THE INVENTION

In its most general form, the invention relates to a process for backing up computer data which consists of transferring the data to be backed up from a client computer to a buffer memory formed by the hard disk of a backup server, organised into a plurality of volumes with predetermined sizes, and then transferring the data from the said buffer memory onto the permanent medium (for example a magnetic cartridge), characterised in that a unique sequence of data for the said volume (basic data) is recorded on the permanent medium after each of the volumes and after the transfer onto the permanent medium, the method also comprising a step in which a database is created in which the basic data are saved.

The basic data include the logical address on the volume start cartridge and the logical address on the volume end cartridge. The basic data include the approximate size of the volume. Advantageously, the basic data include the number of the drive used to transfer the volume from the disk cache to the cartridge and the number of the disk on which the volume is located at the time that it is transferred to the cartridge. The basic data include the number of the disk partition in which the volume is located before it is transferred onto the cartridge. The basic data include the number of the processor used to transfer the volume of the disk cache to the cartridge. The basic data include the bar code of the cartridge containing the volume and/or the name of the cartridge. The basic data contain at least part of the data including the hexadecimal code indicating the cartridge type, the total size of data stored on the cartridge, the maximum capacity of the cartridge, the state of the cartridge loading counter, the hexadecimal code indicating the state of the volume, the number of the host machine in the configuration to which the volume belongs, the character code used in the volume header, the date of the most recent write or modification made to the volume by the host machine, the time of the most recent write or modification made by the host machine, the date of the most recent read access of the volume by the host machine, the time of the most recent read access of the volume by the host machine, the date on which the volume in the disk cache was transferred to the cartridge, and the time at which the volume in the disk cache was transferred to the cartridge. Advantageously, data transferred from the permanent medium to the buffer memory when data are restored to the client computer do not include the basic data.

The invention also relates to equipment for backing up data comprising a backup server controlling a buffer memory organised into volumes of a predetermined size, and a station for reading-writing permanent media, the server comprising a communication interface with at least one client computer for data exchanges, characterised in that the server also comprises a database for saving basic data and means of associating the basic data with data recorded temporarily in the volumes of the buffer memory, and for deleting the basic data when the data are transferred from the permanent media to the buffer memory.

In one operating mode, intended particularly for management of mainframes, data volumes written by host machines are firstly created by the backup equipment according to the invention in a buffer disk space. These volumes have a maximum size fixed at the time of the configuration of the backup equipment system according to the invention, that is usually fairly low and is of the order of 250 Mbytes. Secondly, the volumes are transferred by the backup equipment according to the invention to cartridges, making one or several copies. Only really significant data are transferred to the tape. Thus, a maximum volume of 250 Mbytes may for example only contain 10 Mbytes of data. In this case, only these 10 Mbytes will be transferred to tape, to optimise tape space.

The backup equipment uses a database to internally manage the list of known volumes, storing a certain amount of data such as:

the name of the volume the medium on which it is stored (disk, cartridge), the position on the medium (number of the disk partition, or logical start and end addresses on the cartridge)

etc.

This data is used to find a volume.

At the time that data are transferred from the disk cache to cartridges, the backup equipment according to the invention adds private data called "Basic data", at the end of the transfer of each volume. These data are only written onto the cartridges, and are ignored during transfers in the reverse direction, in the case in which a volume is transferred from a cartridge to the disk cache, for example to be restored by the host machine. Therefore, they are entirely managed internally by the backup equipment according to the invention and transparently for host machines.

The basic data for a given volume are written in the form of an ASCII character string with the following structure:

---

Title CR LF VolumeStartposition VolumeEndposition VolumeSize ReaderChannel \
    DiskChannel DiskPartition ProcessorNumber
    BarCode CartridgeName
    CartridgeType SizeUsed CartridgeSize
    LoadCounter VolumeName VolumeStatus HostCode CodingType
    Writedate Writetime Readdate Readtime
EmptyDate EmptyTime CR LF

---

In this string, fields are separated from each other by a space, the \ character indicates that the rest of the string is described in detail on the next line, for page layout reasons only. \ characters do not appear in the genuine basic data.

Description of Basic Data Fields

Title: title indicating the meaning of the following main fields in abbreviated form.
CR: ASCII character code 0x13 (hexadecimal)
LF: ASCII character code 0x10 code (hexadecimal)
VolumeStartPosition: logical address of the start of the volume on the cartridge.
VolumeEndPosition: logical address of the end of the volume on the cartridge
VolumeSize: approximate size of the volume in kbytes.
ReaderChannel: number of the reader (defined in the backup equipment configuration according to the invention) used to make the transfer from the disk cache volume to the cartridge
DiskChannel: number of the disk (defined in the backup equipment configuration according to the invention) in which the volume is located at the time that it is transferred to the cartridge.
DiskPartition: number of the disk partition in which the volume is located before it is transferred to the cartridge.
ProcessorNumber: number of the processor used to transfer the volume of the disk cache to the cartridge.
BarCode: bar code of the cartridge containing the volume.
CartridgeName: cartridge name, as declared on the backup equipment according to the invention. This name is independent of the bar code.
CartridgeType: hexadecimal code indicating the cartridge type. The possible values are as follows:
0x0000001L operating cartridge
0x00000010L cartridge with read access
0x00000020L cartridge with write access
0x00000080L cartridge being reorganised
0x00000100L cartridge to be reorganised
0x00000200L cartridge not to be reused
0x00000400L blocked empty cartridge
0x00000800L reorganised cartridge
0x00001000L archive type cartridge
0x00002000L mirror type cartridge
0x00010000L cartridge for DLT reader
0x00020000L cartridge for Exabyte reader
0x00040000L cartridge for 3480 reader
0x00080000L cartridge for 3590 reader
0x01F00000L mask for number of the archive pool or mirror to which the cartridge belongs.

The code used for the CartridgeType field may possibly be a combination of the previous values.
SizeUsed: total size of data stored on the cartridge, in Megabytes.
CartridgeSize: maximum capacity of the cartridge, in MegaBytes.
LoadCounter: cartridge load counter. Indicates the number of times that the cartridge was loaded in a reader. These data are used to determine cartridge wear.
VolumeName: volume name, as it is known by the host machine.
VolumeStatus: hexadecimal code indicating the volume status. This code is a combination of indicators for which the access masks and possible values are as follows:
0x0000001L 1 if the volume is valid, and 0 if it is invalid (old version or logically erased volume)
0x0000008L 1 if the volume is of the mirror type
0x00000010L 1 if the volume has a mirror copy on another cartridge
0x00000020L 1 if a copy of this volume is to be made on a mirror cartridge
0x00001000L 1 if the volume is of the archive type
0x00002000L 1 if the volume is shared between several host systems
0x00010000L 1 if the volume must always be copied on DLT cartridges
0x00020000L 1 if the volume must always be copied on Exabyte cartridges
0x00040000L 1 if the volume must always be copied on 3480 cartridges
0x00080000L 1 if the volume must always be copied on 3590 cartridges.
0x01F00000L number of the archive pool or mirror (from 0 to 31)
HostCode: number of the host machine to which the volume belongs, in the backup equipment configuration according to the invention.
CodingType: character code used in the volume header (0=ASCII, 1=EBCDIC)
WriteDate: date of the most recent write or modification of the volume by the host machine, in the form yyyy-mm-dd
WriteTime: time of the most recent write or modification of the volume by the host machine, in the form hh:mm:ss
ReadDate: date of the most recent read access of the volume by the host machine, in the form yyyy-mm-dd
ReadTime: time of the most recent read access of the volume by the host machine, in the form hh:mm:ss
EmptyDate: date on which the disk cache volume was transferred to the cartridge, in the form dd-mm-yyyy
EmptyTime: time at which the disk cache volume was transferred to the cartridge, in the form hh:mm:ss Accumulation of Basic Data Basic data is cumulative, in order to accelerate the analysis of cartridges in order to reconstruct the database.

Figure 1:
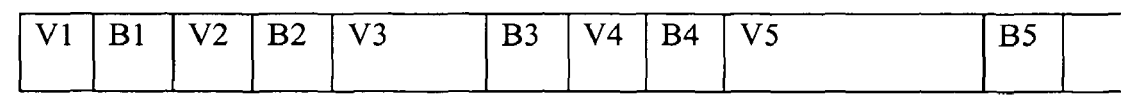

As shown in FIG. 1, assume that a tape contains volumes V1, V2, V3, V4 and V5. The basic data associated with each of these volumes are called B1, B2, B3, B4 and B5. The basic data B1 only contain data related to volume B1. The basic data B2 contain the accumulated data for B1 and data about volume V2 in a single data record. Therefore B2 contains data for V1 and V2.

Basic data B3 contain the accumulated data for B2 and data about volume B3 in a single data record. Therefore B3 contains data for V1, V2 and V3. etc. Therefore the final basic data on the cartridge, that is B5, contain an accumulated total of all data about volumes present on the cartridge.

If a cartridge contains a very large number of volumes, the accumulated basic data may be large. In order to limit this increase in size, a maximum size has been arbitrarily fixed at 132 kbytes. When the standard construction of basic data for a volume exceeds 132 kbytes, the backup equipment according to the invention assigns reduced basic data to this volume, to contain only basic data for this new volume without accumulating data for previous volumes. For subsequent volumes, the standard mechanism for accumulating data for the current volume with data for the previous volume will be repeated.

In the reduced basic data, the VolumeAddress field for the single volume described (volume start logical address on the cartridge) contains an address other than 0.

Referring to FIG. 2, assume that a cartridge contains n+1 volumes. The nth volume ($V_n$) contains complete basic data denoted $B_n$, which therefore contain a list of data for the n first volumes. The first volume described in $B_n$, $V_1$, is indicated with a VolumeAddress field equal to 0. After volume $V_n$ and its basic data $B_n$, the cartridge also contains volume $V_{n+1}$ and basic data $B_{n+1}$ that we assume are reduced. This means that $B_{n+1}$ only contains data for volume $V_{n+1}$ with a VolumeAddress field indicating the position of volume $V_{n+1}$ on the cartridge at an address greater than 0, since the volume $V_{n+1}$ is not located at the beginning of the cartridge. Therefore, by analysing the final basic data on the cartridge ($B_{n+1}$), it is very easy to detect that these data are reduced (since $a_{n+1}>0$) and it can be deduced that the previous basic data ($B_n$) are located on the cartridge immediately before address $a_{n+1}$.

Retrieving Basic Data

If the database on the backup equipment system according to the invention is entirely lost, these basic data can be used to completely reconstruct the database.

A function integrated into the code of the backup equipment processors according to the invention is used to analyse a cartridge to extract the most recent basic data from it. This analysis can also be made by external software; all that is necessary is to move to the end of the tape, to move back one record and to read the last data record.

The basic data thus retrieved at the end of the cartridge contain a description of the volumes on the cartridge. As described in the previous section, if the VolumeAddress field in the first volume contains a value not equal to zero, this means that the first volume is not at the beginning of the tape. The conclusion is that the basic data are reduced. In this case all that is necessary is to move to the address VolumeAddress on the cartridge, and then move back by one record to read the basic data for the previous volume. These data are then accumulated with the basic data for previous volumes.

The cartridge can be read backwards repeatedly until basic data are found in which the VolumeAddress field is equal to 0 for the first volume. All volumes in the cartridge can then be known by accumulating all retrieved basic data.

Reconstruction of the Database from Basic Data

Reconstruction of the database requires that all basic data stored on all cartridges in the library are retrieved and then analysed using an appropriate software. These data include the data necessary to reconstruct the database. The first step in this operation is to draw up a list of all volumes contained on all cartridges, and also to determine whether or not each volume on a cartridge is valid for the host machine. A single volume (same name, same host system) may be stored on several different cartridges, or at several different locations on the same cartridge. This can occur for the following reasons: either there are several different versions of the same volume that have been updated by the host machine several times or the data are the same and they have been moved internally by the backup equipment according to the invention.

In any case, the analysis of the WriteDate and WriteTime basic data for all occurrences of this volume shows which is the most recent copy, and therefore the only valid copy. If the most recent version is present at several locations (same WriteDate and WriteTime data), then any one of these occurrences can be used to become the valid version of the volume in the new database.

All that is necessary then is to recreate an empty database for the backup equipment according to the invention and to fill in all the tables with the collected data.

CONCLUSION

Having now described a preferred embodiment of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

Moreover, the techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

What is claimed is:

1. A method for saving computer data comprising:
   transferring the data to be backed up from a client computer to a buffer memory formed by the hard disk of a backup server, organized into a plurality of volumes with predetermined sizes;
   transferring the data from the buffer memory onto a permanent medium, wherein basic data for each of the plurality of volumes includes a unique sequence of data that is recorded on the permanent medium after said each volume and after the transfer onto the permanent medium; and
   creating a database in which the basic data for said plurality of volumes are saved.

2. A method for saving computer data according to claim 1, wherein the basic data for a volume includes a logical address of a start of the volume on the permanent medium and a logical address of an end of the volume on the permanent medium.

3. A method for saving computer data according to claim 1, wherein the basic data for a volume includes an approximate size of the volume.

4. A method for saving computer data according to claim 1, wherein the basic data for a volume includes a number of a reader used to transfer the volume from the buffer memory to the permanent medium and a number of a disk on which the volume is located at the time that it is transferred to the permanent medium.

5. A method for saving computer data according to claim 1, wherein the basic data for a volume includes a number of a disk partition in which the volume is located before it is transferred to the permanent medium.

6. A method for saving computer data according to claim 1, wherein the basic data for a volume includes a processor number used to transfer the volume of the buffer memory to the permanent medium.

7. A method for saving computer data according to claim 1, wherein the basic data for a volume includes a bar code of the permanent medium containing the volume.

8. A method for saving computer data according to claim 1, wherein the basic data for a volume includes a hexadecimal code indicating the cartridge type, a total size of data stored on the permanent medium, a maximum capacity of the permanent medium, a load counter indicating a number of times the permanent medium was loaded in a reader, a hexadecimal code indicating a state of the volume, a number of a host machine in a configuration to which the volume belongs, a character code used in the volume header, a date of a most recent write or modification made by the host machine, a time of a most recent write or modification made by the host machine, a date of a most recent read access of the volume by the host machine, a time of a most recent read access of the volume by the host machine, a date on which the volume in the buffer memory was transferred to the permanent medium, and a time at which the volume in the buffer memory was transferred to the permanent medium.

9. A method for saving computer data according to claim 1, wherein when a volume of the data is transferred from the permanent medium to the buffer memory when restoring the volume of the data to the client computer, the basic data for the volume is not restored.

10. The method of claim 1, wherein the permanent medium is a magnetic cartridge.

11. The method of claim 1, wherein the buffer memory is a disk cache.

12. Equipment for saving data comprising;
a backup server controlling a buffer memory organized into volumes of a predetermined size, and
a station for reading-writing permanent media, the backup server comprising a communication interface with at least one client computer for data exchanges, wherein the server also comprises a database for saving basic data and means of associating the basic data with data recorded temporarily in the volumes of the buffer memory in connection with writing the data to the permanent media, and for deleting the basic data when the data stored on the permanent media is transferred from the permanent media to the buffer memory.

13. A computer readable medium comprising code stored thereon for saving computer data where the code, when executed, performs a method comprising:
transferring the data to be backed up from a client computer to a buffer memory formed by the hard disk of a backup server, organized into a plurality of volumes with predetermined sizes;
transferring the data from the buffer memory onto a permanent medium, wherein basic data for each of the plurality of volumes includes a unique sequence of data that is recorded on the permanent medium after said each volume and after the transfer onto the permanent medium; and
creating a database in which the basic data for said plurality of volumes are saved.

* * * * *